(12) United States Patent
Marwaha

(10) Patent No.: US 12,339,820 B2
(45) Date of Patent: Jun. 24, 2025

(54) MANAGING RESTRICTED TIME INTERVALS OF ENTITY IDENTIFIERS OF DATA RECORDS IN A DATABASE

(71) Applicant: MASTERCARD INTERNATIONAL INCORPORATED, Purchase, NY (US)

(72) Inventor: Lakshay Marwaha, Jalandhar (IN)

(73) Assignee: MASTERCARD INTERNATIONAL, INCORPORATED Purchase, NY (US)

( * ) Notice: Subject to any disclaimer, the term of this patent is extended or adjusted under 35 U.S.C. 154(b) by 0 days.

(21) Appl. No.: 18/474,086

(22) Filed: Sep. 25, 2023

(65) Prior Publication Data

US 2025/0103568 A1  Mar. 27, 2025

(51) Int. Cl.
  *G06F 16/21* (2019.01)
(52) U.S. Cl.
  CPC .................. *G06F 16/217* (2019.01)
(58) Field of Classification Search
  CPC ....... G06F 16/217; G06F 16/21; G06F 16/215
  See application file for complete search history.

(56) References Cited

U.S. PATENT DOCUMENTS

| 5,555,407 | A * | 9/1996 | Cloutier | H04L 69/04 |
| | | | | 348/E7.071 |
| 7,792,864 | B1 * | 9/2010 | Rice | G06F 16/283 |
| | | | | 707/791 |
| 9,037,536 | B2 * | 5/2015 | Vos | G06F 16/2453 |
| | | | | 707/674 |
| 10,733,157 | B1 * | 8/2020 | Johnston | G06F 3/0481 |
| 11,368,465 | B2 * | 6/2022 | Fuka | H04L 63/102 |
| 11,373,257 | B1 * | 6/2022 | Guo | G06N 20/00 |
| 2007/0276858 | A1 * | 11/2007 | Cushman, II | G06F 16/215 |
| | | | | 707/999.102 |
| 2007/0288490 | A1 * | 12/2007 | Longshaw | G06F 16/217 |
| 2011/0071986 | A1 * | 3/2011 | Schmidt | G06F 16/2358 |
| | | | | 707/684 |
| 2019/0197541 | A1 * | 6/2019 | Rhee | H04W 4/14 |
| 2019/0208014 | A1 * | 7/2019 | Goldberg | G06F 12/1466 |
| 2020/0195469 | A1 * | 6/2020 | McLean | H04L 12/40091 |
| 2022/0269956 | A1 * | 8/2022 | Daruna | G06N 20/00 |
| 2022/0391954 | A1 * | 12/2022 | Benkreira | G06F 18/24 |
| 2023/0036235 | A1 * | 2/2023 | Park | H04W 76/18 |

(Continued)

*Primary Examiner* — Robert W Beausoliel, Jr.
*Assistant Examiner* — Susan F Rayyan
(74) *Attorney, Agent, or Firm* — Barta Jones, PLLC

(57) ABSTRACT

A computerized method manages entity identifiers (EIDs) of data records in a database, including restricting and releasing EIDs associated with deactivated data record entities. An EID uniquely identifies the deactivated data record entity among a group of data record entities. The obtained EID is restricted from being assigned to another data record entity, and interaction data associated with the EID and deactivated data record entity is obtained. The interaction data is associated with interactions of the deactivated data record entity prior to deactivation. A release time of the EID is determined using the obtained interaction data. The EID is later released for assignment based on the determined release time and then assigned to a new data record entity. The dynamic calculation of the release time reduces the time intervals during which EIDs are restricted, and increases the rate at which EIDs can be reused with new data record entities.

20 Claims, 5 Drawing Sheets

(56) References Cited

U.S. PATENT DOCUMENTS

| | | | |
|---|---|---|---|
| 2023/0315737 A1* | 10/2023 | Franklin | G06F 16/24556 |
| | | | 707/692 |
| 2023/0409563 A1* | 12/2023 | Franklin | G06F 16/256 |
| 2023/0409578 A1* | 12/2023 | Franklin | G06F 16/215 |
| 2024/0028369 A1* | 1/2024 | Bai | G06F 9/4411 |
| 2024/0045864 A1* | 2/2024 | Kumar | G06F 16/2453 |
| 2024/0086425 A1* | 3/2024 | Rohm | G06F 16/285 |
| 2024/0126732 A1* | 4/2024 | Ablitt | G06F 16/215 |
| 2024/0205303 A1* | 6/2024 | Oleinikov | G06Q 10/06315 |

* cited by examiner

MANAGING RESTRICTED TIME INTERVALS OF ENTITY IDENTIFIERS OF DATA RECORDS IN A DATABASE

BACKGROUND

In some systems, data record entities in a database are identified with entity identifiers from a limited pool of possible entity identifiers. When a data record entity is terminated or otherwise deactivated in the database, the associated entity identifier is restricted from reassignment for a static period of time. That is, to prevent interference events from occurring for a new data record entity to which the entity identifier is later assigned, entity identifiers are restricted from reassignment for the static time interval after the deactivation of associated data record entities. Because the entity identifiers are selected from a limited pool of possible entity identifiers, the quantity of new data record entities to which entity identifiers can be reassigned is limited. Further, scalability is limited by the size of the pool of possible entity identifiers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for managing entity identifiers (EIDs), including restricting and releasing EIDs associated with deactivated data record entities, is described. An EID associated with a deactivated data record entity is obtained, wherein the EID uniquely identifies the deactivated data record entity among a group of data record entities. The obtained EID is restricted from being assigned to another data record entity and interaction data associated with the EID and deactivated data record entity is obtained. The interaction data is associated with interactions between the deactivated data record entity and other entities prior to deactivation of the deactivated data record entity. A release time of the EID is determined using the obtained interaction data. The restricted EID is later released for assignment based on the determined release time and then assigned to a new data record entity.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 5, the systems are illustrated as schematic drawings. The drawings may not be to scale. Any of the figures may be combined into a single example or embodiment.

DETAILED DESCRIPTION

Figure 1:
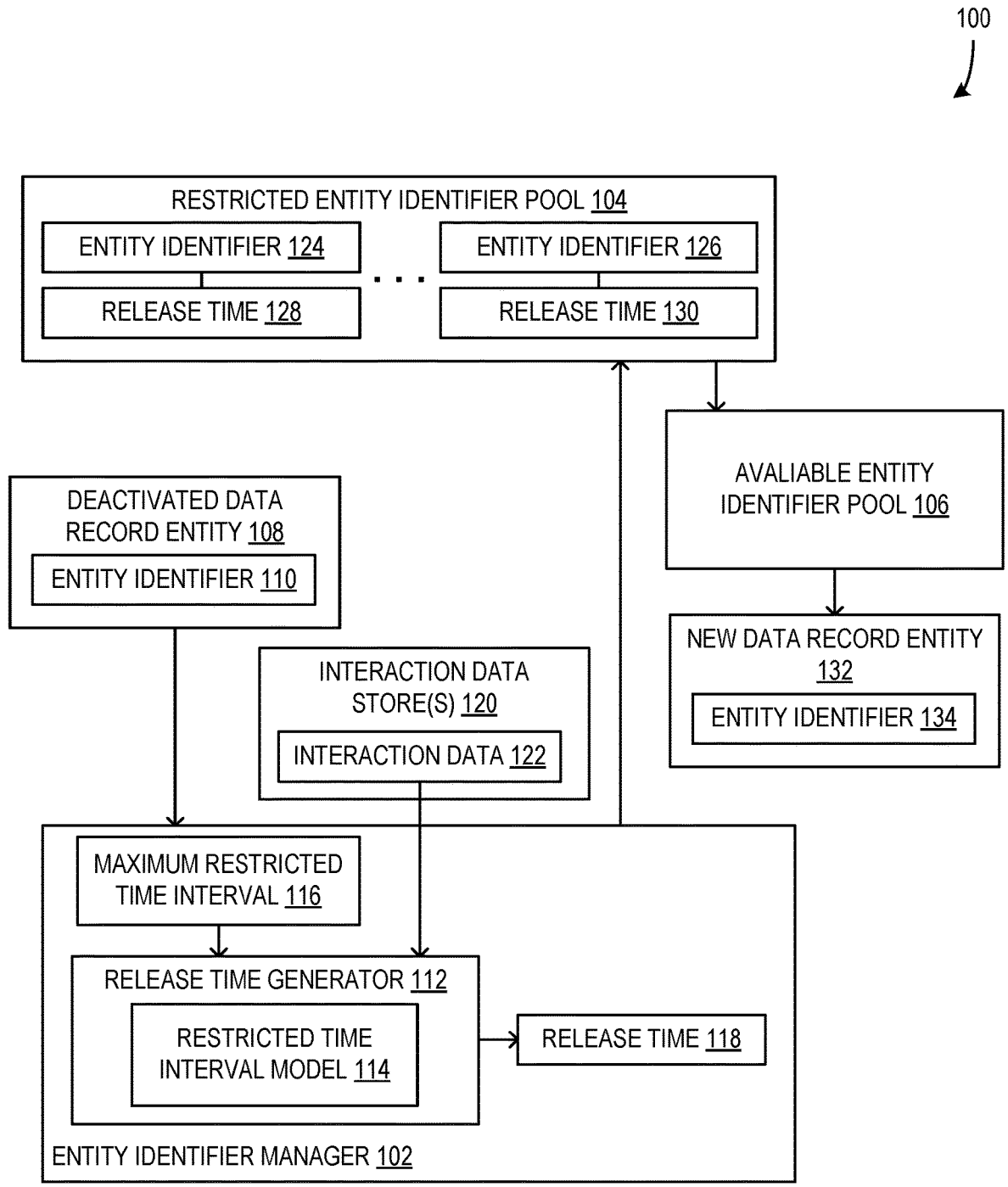
FIG. 1 is a block diagram illustrating an example system configured to dynamically release restricted entity identifiers based on associated interaction data.

Aspects of the disclosure provide a platform for managing the restriction and release of entity identifiers (EIDs) when associated data record entities are terminated or otherwise deactivated in a database or other data store. Because the EIDs are reassigned to new data record entities, the restriction time interval is used to prevent and/or reduce the likelihood of interference events occurring to the new data record entities. An interference event is an event linked to a deactivated data record entity by a reassigned EID (e.g., an EID that has been reassigned to another data record entity) and linked to another data record entity. For example, a recurring transaction is directed to a new account instead of a deactivated account that previously used the same account number. The disclosure describes a platform that obtains an EID of a deactivated data record entity and restricts that EID from being assigned to another data record entity. Interaction data associated with the deactivated data record entity and the EID is obtained, and a release time for the EID is determined using the obtained interaction data. The restricted EID is released for assignment based on the determined release time, and the released EID is assigned to a new data record entity. The determined release time is not static or constant for all deactivated data record entities. Rather, the determination of the release time is a dynamic operation dependent on characteristics (e.g., statistics, metrics, or other data) of the deactivated data record entity.

The disclosure operates in an unconventional manner at least by dynamically determining a release time that is specific to each EID of a deactivated data record entity. This is in contrast to existing systems that use a static restricted time interval for all EIDs, which requires that all EIDs be restricted for a time interval to prevent interference events for even the EIDs with a low likelihood or probability of having an interference event. With aspects of the disclosure, depending on the interactions in which the now-deactivated data record entity was involved, the necessary restricted time interval for an associated EID may be much shorter than that static restricted time interval. The disclosure analyzes the past interaction data of a deactivated data record entity and the associated EID, and generates a restricted time interval and/or an associated release time that reduces the total time the EID is restricted while still preventing interference events for a new data record entity to which the EID is reassigned. Thus, the disclosure improves management of computing resources the average amount of time that EIDs are restricted is reduced, and the average quantity of EIDs that are restricted at any given time is reduced. This means that the pools of EIDs may be smaller, requiring less memory. Further, the average time that a new data record entity waits for an EID to be assigned is also reduced, which can reduce processor usage. The disclosure reduces the use of data storage resources and consumption of related system resources associated with storing restricted EIDs. Additionally, in some examples, the system resources consumed when managing new data record entities that are waiting for EID assignment are reduced significantly due to the disclosure enabling many EIDs to be reassigned more quickly than a static restriction time interval.

FIG. 1 is a block diagram illustrating an example system 100 configured to dynamically release restricted entity identifiers (EIDs) (e.g., entity identifiers 124-126) based on associated interaction data (e.g., interaction data 122). The system 100 includes an entity identifier manager 102, a restricted entity identifier pool 104, and an available entity identifier pool 106. In some examples, a deactivated data record entity 108 is associated with an EID 110 and the EID manager 102 is configured to determine a release time 118 of the EID 110. The EID 110 is added to the restricted EID pool 104 upon the deactivated data record entity 108 being deactivated, such that the EID 110 cannot be immediately reassigned to a new data record entity (e.g., new data record entity 132). By restricting the reassignment of EIDs, the system 100 prevents new data record entities from being affected by interactions of the deactivated data record entities that are associated with the restricted EIDs. For example, a deactivated data record entity 108 is a payment account and the EID 110 is an account number associated with the payment account. When the payment account is deactivated, payment interactions associated with the account number can occur later (e.g., automatic recurring payments will occur). Thus, the system 100 restricts the assignment of EIDs 124-126 for dynamically determined time periods to prevent interactions of the deactivated data record entities from affecting new data record entities.

In some examples, the system 100 includes one or more computing devices (e.g., the computing apparatus of FIG. 5) that are configured to communicate with each other via one or more communication networks (e.g., an intranet, the Internet, a cellular network, other wireless network, other wired network, or the like). In some examples, entities of the system 100 are configured to be distributed between multiple computing devices and to communicate with each other via network connections. For example, the EID manager 102 is executed on a first computing device and the EID pools 104-106 are each located on other computing devices within the system 100. The first computing device and other computing devices are configured to communicate with each other via network connections. Alternatively, in some examples, components of the EID manager 102 (e.g., the release time generator 112 and the restricted time interval model 114) are executed on separate computing devices and those separate computing devices are configured to communicate with each other via network connections during the operation of the EID manager 102. In other examples, other organizations of computing devices are used to implement system 100 without departing from the description.

The EID manager 102 includes hardware, firmware, and/or software configured to obtain EIDs 110 of deactivated data record entities 108, generate release times 118 associated with the obtained EIDs 110, and recording the EIDs 110 and associated release times 118 in the restricted EID pool 104. Further, in some examples, the EID manager 102 is configured to obtain interaction data 122 from one or more interaction data stores 120 and to use the interaction data 122 and a maximum restricted time interval 116 as input to a release time generator 112 when generating the release times 118. Additionally, or alternatively, the release time generator 112 includes a restricted time interval model 114 that is trained using machine learning techniques to generate optimized restricted time intervals for EIDs 110, which are then used to determine the release times 118 as described herein.

It should be understood that, in some examples, the pool of possible EIDs is limited. In some examples, EIDs have validity requirements. For example, an EID is made up of a finite number of characters (e.g., numerical digits, letters, and/or other symbols), establishing a limit to the quantity of possible EIDs. Additionally, or alternatively, other validity requirements are used to define EIDs, such as patterns of types of characters, numerical patterns that provide additional information about the associated data record entity, or the like. For example, EIDs include two letters followed by ten numerical digits. In another example, the first two characters of an EID are a numerical digit pattern selected from a group of numerical digit patterns that indicate a type of data record entity to which the EID is assigned. For example, a '10' code at the beginning of an EID indicates that the associated data record entity is of a first type, while a '23' code at the beginning of an EID indicates that the associated data record entity is of a second type.

In some examples, the EID manager 102 is configured to calculate or otherwise determine release times 118 that minimize or otherwise optimize the times during which EIDs are kept in the restricted EID pool 104. By minimizing the times during which individual EIDs are restricted, the total quantity of restricted EIDs at one time is reduced and the total quantity of EIDs available for assignment at the same time is increased. Thus, the system 100 enables the quantity of active data record entities to be maximized or otherwise optimized.

Further, in some examples, the release time generator 112 of the EID manager 102 is configured to analyze interaction data 122 associated with a deactivated data record entity 108 and its EID 110 to determine the release time 118 of the EID 110. In some of such examples, the interaction data 122 is associated with one or more interactions between the deactivated data record entity 108 and other entities, and the one or more interactions are linked to the deactivated data record entity 108 using the EID 110 of that deactivated data record entity 108. For example, the entities associated with an interaction are two bank accounts and the interaction is a transaction between the two bank accounts. In such an example, the interaction data 122 of the interaction includes the EIDs of both bank accounts, a quantity of money or value that is exchanged between the two bank accounts, a date upon which the transaction occurred, or the like. Because the interactions with which the interaction data 122 are associated are linked to the now deactivated data record entity 108 through the EID 110, it is possible for those interactions to later affect a new data record entity 132 to which the EID 110 is later assigned. Thus, the quantity, type, and/or timing of the interactions described by the interaction data 122 are used to determine the likelihood that any of those interactions will affect an entity with the EID 110 in the near future.

In some examples, the release time generator 112 analyzes the interaction data 122 by categorizing the interactions of the interaction data 122 by type, date, and/or other attributes of the interactions. Additionally, or alternatively, the release time generator 112 generates data values that describe aspects or features of the interaction data 122, such as a total quantity of interactions, a total quantity of other entities with which interactions occurred, a total quantity of recurring interactions with other entities, and/or a total quantity of interactions with specific types of entities (e.g., interactions with cross-border entities). Numeric values describing the quantities of interactions in each category and/or describing aspects or features of the interaction data are then mapped to interval modifier scores and the multiple interval modifier scores are combined into a combined interval modifier score. The combined interval modifier score is applied to the maximum restricted time interval 116 to calculate the release time 118. In some of such examples, mapping the quantity values of interaction categories includes identifying quantity value ranges in which the quantity values fall and determining interval modifier scores from defined range-to-score maps, as described below with respect to FIG. 2.

Further, in some examples, the interaction data 122 is obtained from one or more interaction data stores 120 and the interaction data 122 is associated with interactions that have occurred within a defined time period prior to the deactivation of the deactivated data record entity 108. For example, the interaction data 122 includes data associated with interactions from the six months prior to the deactivation of the deactivated data record entity 108. In other examples, time periods are used without departing from the description.

Additionally, or alternatively, the maximum restricted time interval 116 is a defined time interval that determines the maximum amount of time that EIDs are placed in the restricted EID pool 104. For example, the maximum restricted time interval 116 is 18 months. In other examples, other intervals are used without departing from the description. As described herein, the maximum restricted time interval 116 is adjusted by the release time generator 112 to determine the release time 118 of the EID 110 when it is added to the restricted EID pool 104.

In some examples, the release time generator 112 includes a restricted time interval model 114. The restricted time interval model 114 is a model trained using machine learning techniques to receive interaction data 122 and a maximum restricted time interval 116 as input and to generate a release time 118 for an EID 110. In some of such examples, the restricted time interval model 114 is trained using interaction data sets associated with an EID and result data indicating whether assignment of the EID to a new data record entity after a certain period of restriction led to the new data record entity being affected by one or more of the interactions described in the interaction data sets. The restricted time interval model 114 is provided an interaction data set associated with an EID as input, and the restricted time interval model 114 generates a release time 118. The generated release time 118 is then compared to the result data. If the generated release time 118 would result in the EID being assigned to a new data record entity in a shorter time than indicated in the result data and the result data indicates that a new data record entity was negatively affected by a prior interaction associated with the EID, the restricted time interval model 114 is adjusted such that it would generate a longer release time 118 given the same input. Alternatively, if the generated release time 118 would result in the EID being assigned to a new data record entity in a longer time than indicated in the result data and the result data indicates that the new data record entity was not negatively affected by a prior interaction associated with the EID, the restricted time interval model 114 is adjusted such that it would generate a shorter release time 118 given the same input. In other examples, the restricted time interval model 114 is trained in other ways without departing from the description.

The restricted EID pool 104 is a data store that stores a list or group of EIDs 124-126 that are currently restricted and, therefore, cannot be assigned to new data record entities 132. Each EID 124-126 is associated with a specific release time 128-130 (e.g., a release time 118 calculated by the EID manager 102 as described herein). When a release time 128 of an EID 124 is reached, the EID 124 is moved to the available EID pool 106. From the EID pool 106, the EID 124 can be assigned to a new data record entity 132 as the EID 134. In some examples, the EID manager 102 or other entity of the system 100 monitors the release times 128-130 of the EIDs 124-126. When a release time 128-130 is reached, the associated EID 124-126 is transferred to the available EID pool 106.

The available EID pool 106 is a data store that stores a list or group of EIDs that can be assigned to new data record entities, such as new data record entity 132. When a new data record entity 132 is created or otherwise activated, it is assigned an EID 134 from the available EID pool 106. In examples where the pool of possible EIDs is limited, if there are no EIDs in the available EID pool 106, a new data record entity 132 cannot be assigned an EID 134. In so far as the new data record entity 132 requires an EID 134 to interact with other entities and/or otherwise operate, the new data record entity 132 is prevented from doing so until an EID becomes available for assignment to the new data record entity 132.

In some examples, the EID manager 102 is configured to monitor and/or analyze interaction data 122 associated with restricted EIDs 124-126 over time and to update release times 128-130 as indicated by such analysis. For example, the EID manager 102 periodically obtains interaction data 122 associated with an EID 124 in the restricted EID pool 104. The obtained interaction data 122 is associated with interactions that have occurred within a defined time period, such that the quantity of interaction data 122 that is obtained decreases over time as some interactions become older and do not fall in the defined time period. The obtained interaction data 122 is analyzed using the release time generator 112 and/or the restricted time interval model 114 as described herein to generate a new release time 118. If the new release time 118 will result in the EID 124 becoming available sooner, the new release time 118 replaces the release time 128 stored in the restricted EID pool 104. Further, in some such examples, the release time generator 112 and/or restricted time interval model 114 are provided with information indicating how long the EID 124 has been restricted as input, which may also affect whether the release time 128 is updated.

In some examples, the EIDs are account numbers, and the data record entities are credit card accounts or other types of payment accounts. In some of such examples, the EID manager 102 is configured to generate a health rating of the deactivated account 108 using the interaction data 122, which includes data associated with transactions with which the deactivated account 108 is associated. For example, the interaction data 122 includes a relatively large quantity of transactions associated with the account 108 and historical data indicating that balances of the account 108 were paid on a regular basis. Such an account 108 may be found to have a high health rating, indicating that the user of the account 108 is a desirable customer. Further, in some examples, the EID manager 102 is configured to cause the user of the account 108 to be prompted and/or otherwise incentivized to restore the account 108 (e.g., the user is offered to have the account number 110 restored if they resume use of the account 108). Thus, in some of such examples, instead of the restricted account number 110 being released for assignment, it is instead restored for use with the reactivated account 108.

In other examples, the EID manager 102 is configured to take other actions associated with deactivated data record entities 108 and associated EIDs 110 without departing from the description.

Figure 2:
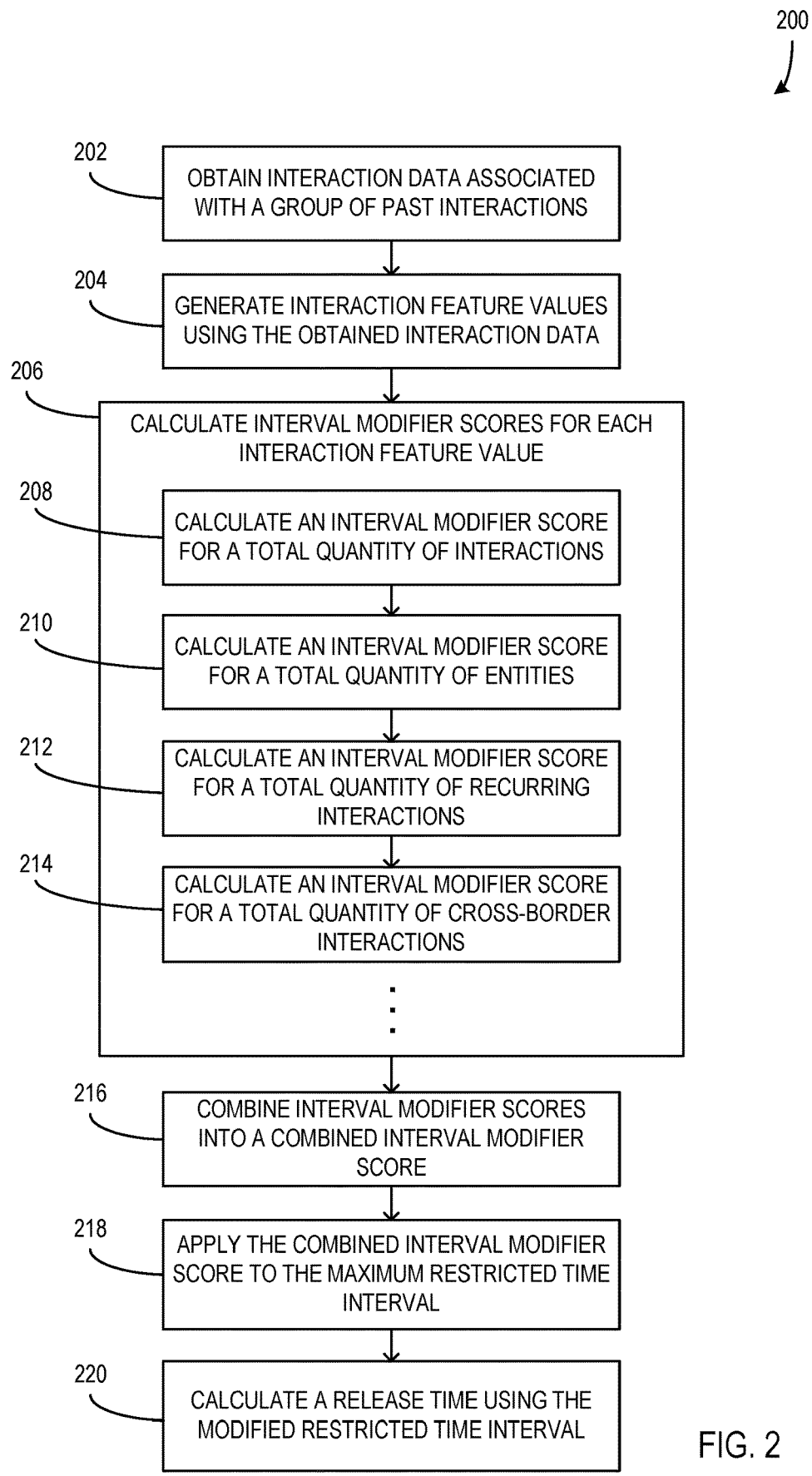
FIG. 2 is a flowchart illustrating a method for calculating a release time of an entity identifier using interaction data.

FIG. 2 is a flowchart illustrating a method 200 for calculating a release time (e.g., release time 118) of an EID (e.g., EID 110) using interaction data (e.g., interaction data 122). In some examples, the method 200 is executed or otherwise performed in a system such as system 100 of FIG. 1.

At 202, interaction data associated with the EID is obtained. The interaction data is associated with a group of past interactions (e.g., all interactions associated with the EID that occurred in the past three months). In some examples, the interaction data is obtained from one or more interaction data stores. For example, a first type of interaction data is obtained from a first interaction data store and a second type of interaction data is obtained from a second interaction data store.

At 204, interaction feature values are generated using the obtained interaction data. As described herein, the interaction feature values are generated by analyzing the interactions of the interaction data and extracting features, statistics, aspects, categories, or the like from the group of interactions. In some examples, the features that are described by the interaction feature values are features that are known to or likely to have an effect on the likelihood that a new data record entity to which the EID is assigned will be negatively affected based on past interactions.

At 206, interval modifier scores are calculated for each interaction feature value. Some example interaction feature values and associated interval modifier score calculations are described below with respect to 208-214, but in other examples, more, fewer, or different types of interaction feature values are used to calculate interval modifier scores without departing from the description. In some examples, the calculation of interval modifier scores includes comparing the interaction feature values to defined interaction feature value tables. Such tables include mappings from ranges of interaction feature values to interval modifier scores and are defined based on the degree to which various interaction feature values affect the likelihood that a new data record entity will be affected by past interactions.

In an example, at 208, an interval modifier score is calculated for a total quantity of interactions. Table 1 below shows an example mapping of ranges of total interaction quantity values to interval modifier scores, which are values between 0 and 1.

TABLE 1

| Range of Total Interaction Quantity Values | Interval Modifier Score |
|---|---|
| 0-1000 | 0.2 |
| 1001-5000 | 0.4 |
| 5001-20,000 | 0.6 |
| 20,001-50,000 | 0.8 |
| 50,001- . . . | 1.0 |

As illustrated in the above table, if the total interaction quantity value of the EID is between 5001 and 20,000, the calculated interval modifier score is 0.6. Other total interaction quantity values are mapped to other interval modifier scores as shown in Table 1.

In an example, at 210, an interval modifier score is calculated for a total quantity of entities with which the previous data record entity interacted. Table 2 below shows an example mapping of ranges of total entity values to interval modifier scores, which are values between 0 and 1.

TABLE 2

| Range of Total Entity Values | Interval Modifier Score |
|---|---|
| 0-10 | 0.2 |
| 11-50 | 0.4 |
| 51-100 | 0.6 |
| 101-300 | 0.8 |
| 301- . . . | 1.0 |

As illustrated in Table 2, if the total entity quantity value of the EID is between 11 and 50, the calculated interval modifier score is 0.4. Other total interaction quantity values are mapped to other interval modifier scores as shown in Table 2.

In an example, at 212, an interval modifier score is calculated for a total quantity of recurring interactions (e.g., sets of interactions with the same entity that recur over time). Table 3 below shows an example mapping of ranges of total interaction entity values to interval modifier scores, which are values between 0 and 1.

TABLE 3

| Range of Recurring Interaction Quantity Values | Interval Modifier Score |
|---|---|
| 0-10 | 0.2 |
| 11-20 | 0.4 |
| 21-30 | 0.6 |
| 31-50 | 0.8 |
| 51- . . . | 1.0 |

As illustrated in the above table, if the recurring interaction quantity value of the EID is between 31 and 50, the calculated interval modifier score is 0.8. Other total interaction quantity values are mapped to other interval modifier scores as shown in Table 3.

In an example, at 214, an interval modifier score is calculated for a total quantity of cross-boundary interactions (e.g., interactions where the entities are located in separate countries or other geographic territories). Table 4 below shows an example mapping of ranges of total cross-boundary interaction values to interval modifier scores, which are values between 0 and 1.

TABLE 4

| Range of Cross-boundary Interaction Quantity Values | Interval Modifier Score |
|---|---|
| 0-500 | 0.2 |
| 501-1500 | 0.4 |
| 1501-5000 | 0.6 |
| 5001-10,000 | 0.8 |
| 10,001- . . . | 1.0 |

As illustrated in the above table, if the cross-boundary interaction quantity value of the EID is between zero and 500, the calculated interval modifier score is 0.2. Other total interaction quantity values are mapped to other interval modifier scores as shown in Table 4.

It should be understood that, in other examples, more, fewer, or different interaction feature values are used to calculate or otherwise generate interval modifier scores without departing from the description.

At 216, the interval modifier scores are combined into a combined interval modifier score. In some examples, combining the interval modifiers scores includes multiplying the scores with each other. For instance, in the above examples, the scores 0.6, 0.4, 0.8, and 0.2 have been calculated and combining them through multiplication results in a combined interval modifier score of 0.0384. In other examples, other methods of combining interval modifier scores are used without departing from the description.

At 218, the combined interval modifier score is applied to the maximum restricted time interval. In some examples, applying the combined interval modifier score to the maximum restricted time interval includes multiplying the maximum restricted time interval by the combined interval modifier score. For example, the maximum restricted time interval is 18 months, or 548 days. The combined interval modifier score of 0.0384 is multiplied by 548 days to obtain 21.0432 days. In some of such examples, fractional days are rounded up, yielding a modified restricted time interval of 22 days for the EID being analyzed. In other examples, other methods of applying the combined interval modifier score to the maximum restricted time interval are used without departing from the description.

At 220, a release time is calculated using the modified restricted time interval. In some examples, a current time is determined, and the modified restricted time interval is added to that current time to obtain the release time. The release time is then stored with the EID in the restricted EID pool (e.g., the restricted EID pool 104).

Figure 3:
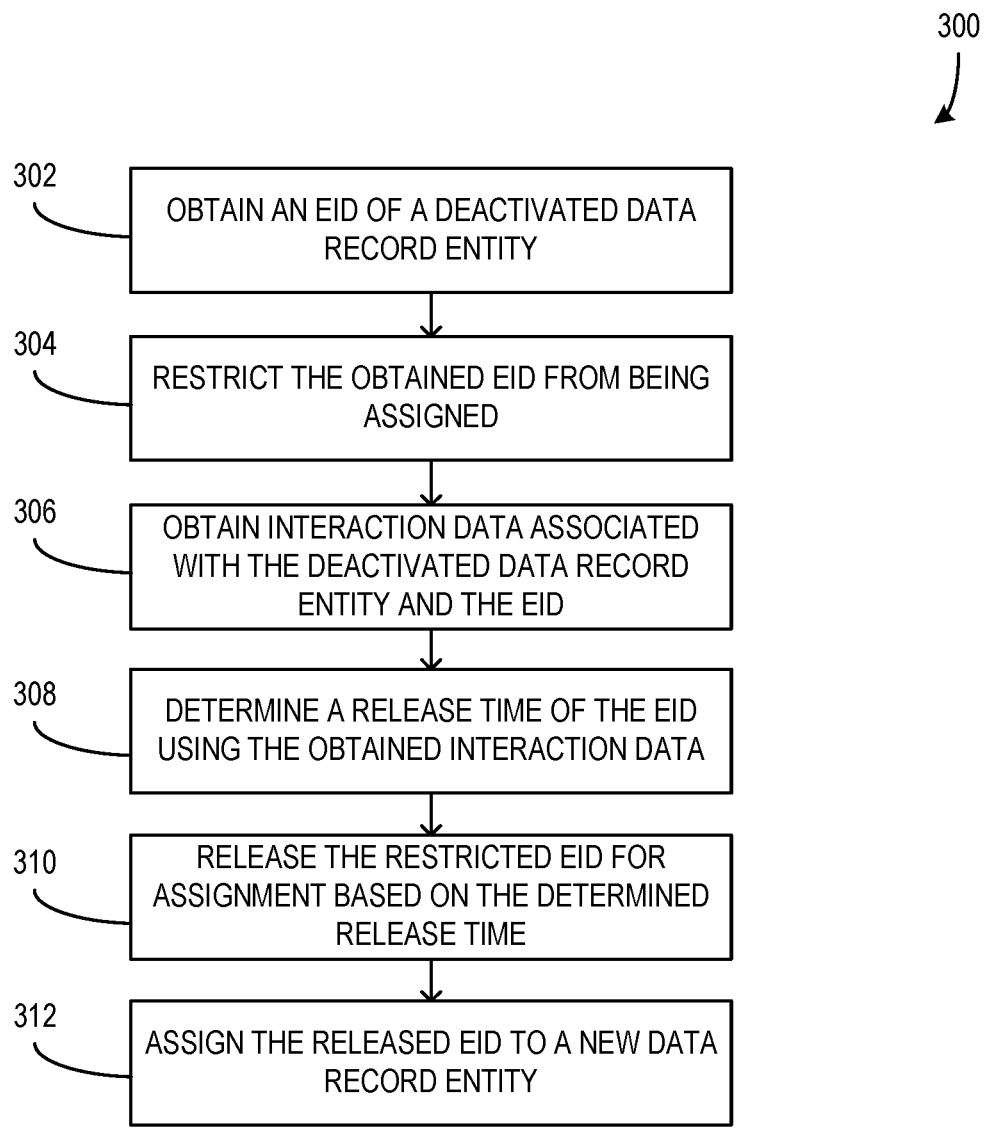
FIG. 3 is a flowchart illustrating a method for restricting and assigning entity identifiers based on deactivation of associated data record entities.

FIG. 3 is a flowchart illustrating a method 300 for restricting and assigning EIDs (e.g., EIDs 110, 124, 126, and/or 134) based on deactivation of associated data record entities (e.g., deactivated data record entity 108). In some examples, the method 300 is executed or otherwise performed in a system such as system 100 of FIG. 1.

At 302, an EID of a deactivated data record entity is obtained. In some examples, the system performing method 300 is configured to detect the deactivation of data record entities associated with the system and to obtain the EIDs of those deactivated data record entities. Alternatively, or additionally, in some examples, the EID is provided to the system via an interface of the system. For example, a related system that manages the deactivation of data record entities sends the EID of each deactivated data record entity to the system performing method 300 as part of the deactivation process.

At 304, the obtained EID is restricted from being assigned. In some examples, restricting the obtained EID includes adding the EID to a restricted EID pool 104 and/or otherwise prevent the EID from being placed in or remove the EID from an available EID pool 106. Alternatively, in other examples, the EID is restricted from being assigned in other ways without departing from the description.

At 306, interaction data associated with the deactivated data record entity and/or the EID is obtained. In some examples, the interaction data is interaction data 122 associated with interactions in which the deactivated data record entity participated prior to being deactivated. Further, in some examples, the interactions of the interaction data are from a defined time period prior to the deactivation of the data record entity (e.g., all interactions that occurred within six months of the deactivation). In some of such examples, the interactions of the interaction data are linked to or indexed to the deactivated data record entity by the EID, such that future events arising out of any of the interactions may interfere with a new data record entity 132 to which the EID is later assigned.

At 308, a release time of the EID is determined using the obtained interaction data. In some examples, determining the release time includes analyzing and/or processing the interaction data using a release time generator 112 as described herein with respect to FIGS. 1 and 2. Additionally, or alternatively, the determination of the release time includes the generation of a restricted time interval using a restricted time interval model 114 as described herein with respect to FIGS. 1 and 4. Further, in some examples, determining the release time includes calculating and/or generating one or more interval modifiers based on the obtained interaction data, combining the one or more interval modifiers into a combined interval modifier, and applying the combined interval modifier to a current time to obtain the release time of the EID. In some of such examples, the determined release time is stored with the EID in the restricted EID pool 104 as described with respect to FIG. 1.

At 310, the restricted EID is released for assignment based on the determined release time. In some examples, the release time of the restricted EID is monitored and, when the release time occurs, the EID is transferred or added to an available EID pool 106.

At 312, the released EID is assigned to a new data record entity 132. In some examples, the EIDs in the available EID pool 106 are managed such that the EID assigned to the next new data record entity 132 is the EID that has been in the available EID pool 106 for the longest time. Alternatively, in other examples, the EIDs are assigned from the available EID pool 106 using other methods without departing from the description. It should be understood that the EID released at 310 is not necessarily assigned to a new data record entity immediately, as other EIDs may be assigned before the released EID and/or time may pass prior to a new data record entity being assigned an EID.

In some examples, while the EID is restricted, the method 300 includes obtaining updated interaction data associated with the deactivation data record entity and/or the EID prior to the release of the EID. Then, an updated release time of the EID is determined using the updated interaction data and the updated release time is used when later releasing the restriction from the EID and making it available for assignment. In some of such examples, the updated interaction data includes a reduced quantity of interaction data as some of the interaction data becomes older than the time threshold used when obtaining interaction data. Alternatively, or additionally, the updated interaction data includes a type of interaction data that was previously not obtained and/or considered during the determination of the prior release time.

Figure 4:
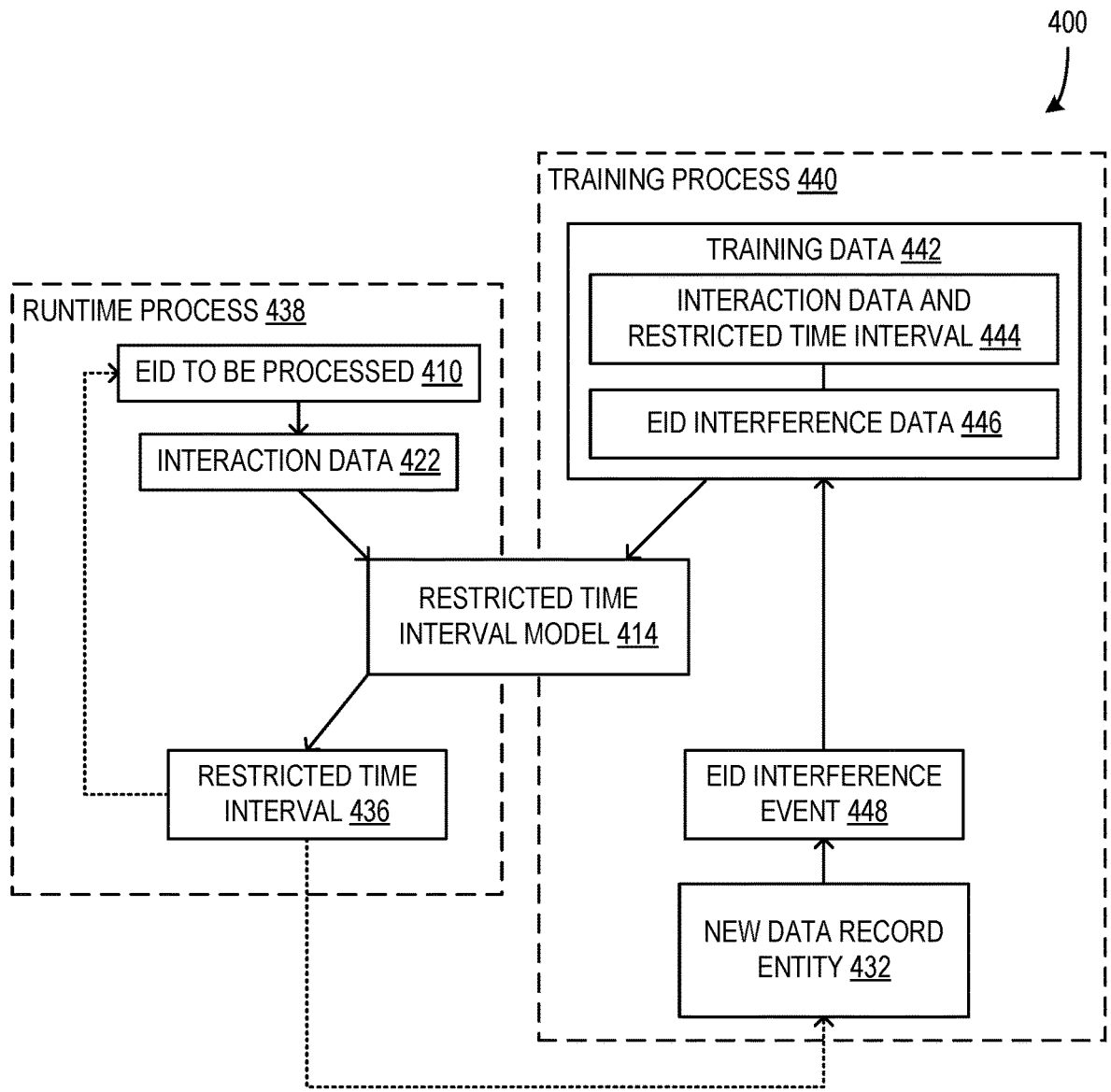
FIG. 4 is a diagram illustrating a runtime process and a training process of a restricted time interval model.

FIG. 4 is a diagram 400 illustrating a runtime process 438 and a training process 440 of a restricted time interval model 414. In some examples, the restricted time interval model 414 is part of a system such as system 100 of FIG. 1.

As described above with respect to the restricted time interval model 114 of FIG. 1, the restricted time interval model 414 is trained using machine learning techniques to generate restricted time intervals 436 that are optimized to be as short as possible while still preventing EID interference events for new data record entities to which the associated EIDs are assigned.

The runtime process 438 of the restricted time interval model 414 begins with an EID to be processed 410. Interaction data 422 associated with the EID 410 is obtained and provided to the restricted time interval model 414 as input. Further, in some examples, the restricted time interval model 414 is provided a maximum restricted time interval 116 as input as well. The restricted time interval model 414 then generates a restricted time interval 436 using the interaction data 422.

The training process 440 of the restricted time interval model 414 begins with training data 442 being used to train the restricted time interval model 414 using machine learning techniques. In some examples, the training data 442 includes interaction data and an associated restricted time interval 444 that was used with an EID. The paired interaction data and restricted time intervals 444 are each linked to EID interference data 446, including time data indicating a time at which the EID interference events (e.g., EID interference event 448) occur. Additionally, or alternatively, in some examples, the training data 442 includes the interaction data and restricted time interval 444 pairs, along with associated indications that no EID interference events occurred after the associated EID was released. The training of the restricted time interval model 414 using the training data 442 enables the restricted time interval model 414 to generate restricted time intervals 436 that are optimized to be as short as possible while still preventing the occurrence of EID interference events to a defined degree of confidence.

In addition to the initial training of the restricted time interval model 414, the training process 440 includes an ongoing training process. Restricted time intervals 436 that are generated by the restricted time interval model 414 and the associated EIDs are tracked and, upon an associated EID being assigned to a new data record entity 432, that new data record entity 432 is monitored for EID interference events 448. If an EID interference event 448 occurs in association with the new data record entity 432, the interaction data 422 and restricted time interval 436 associated with the EID of the new data record entity 432 are combined with data associated with the EID interference event 448 and included in the training data 442. Later, the restricted time interval model 414 is trained or fine-tuned using the updated training data 442, such that the accuracy of the restricted time intervals 436 generated by the restricted time interval model 414 is improved over time.

In some examples, the fine-tuning training process of the training process 440 is performed periodically (e.g., once every two weeks). Alternatively, or additionally, in some examples, the fine-tuning training process is performed when the quantity of new entries in the training data 442 exceeds a defined threshold. For example, the fine-tuning process is performed when the training data includes 100 new entries with which the restricted time interval 414 has not been trained.

Further, in some examples, the runtime process 438 and training process 440 are performed in parallel and/or substantially simultaneously to the degree possible. For instance, a first version of the restricted time interval model 414 is performing the runtime process 438 by generating the restricted time intervals 436 for each EID to be processed 410. In parallel, at least some of the generated restricted time intervals 436 are added to the training data 442 as part of training data entries. While the first version of the restricted time interval model 414 is performing the runtime process 438, another instance of the first version of the restricted time interval model 414 is fine-tuned using at least the new entries in the training data 442, resulting in a second version of the restricted time interval model 414. Then, the first version of the restricted time interval model 414 that is performing the runtime process 438 is then replaced with the second version of the restricted time interval model 414, which then resumes the performance of the runtime process 438. In this manner, the restricted time interval model 414 is fine-tuned using real training data over time to improve the accuracy and/or efficiency of the generated restricted time intervals 436.

Exemplary Operating Environment

Figure 5:
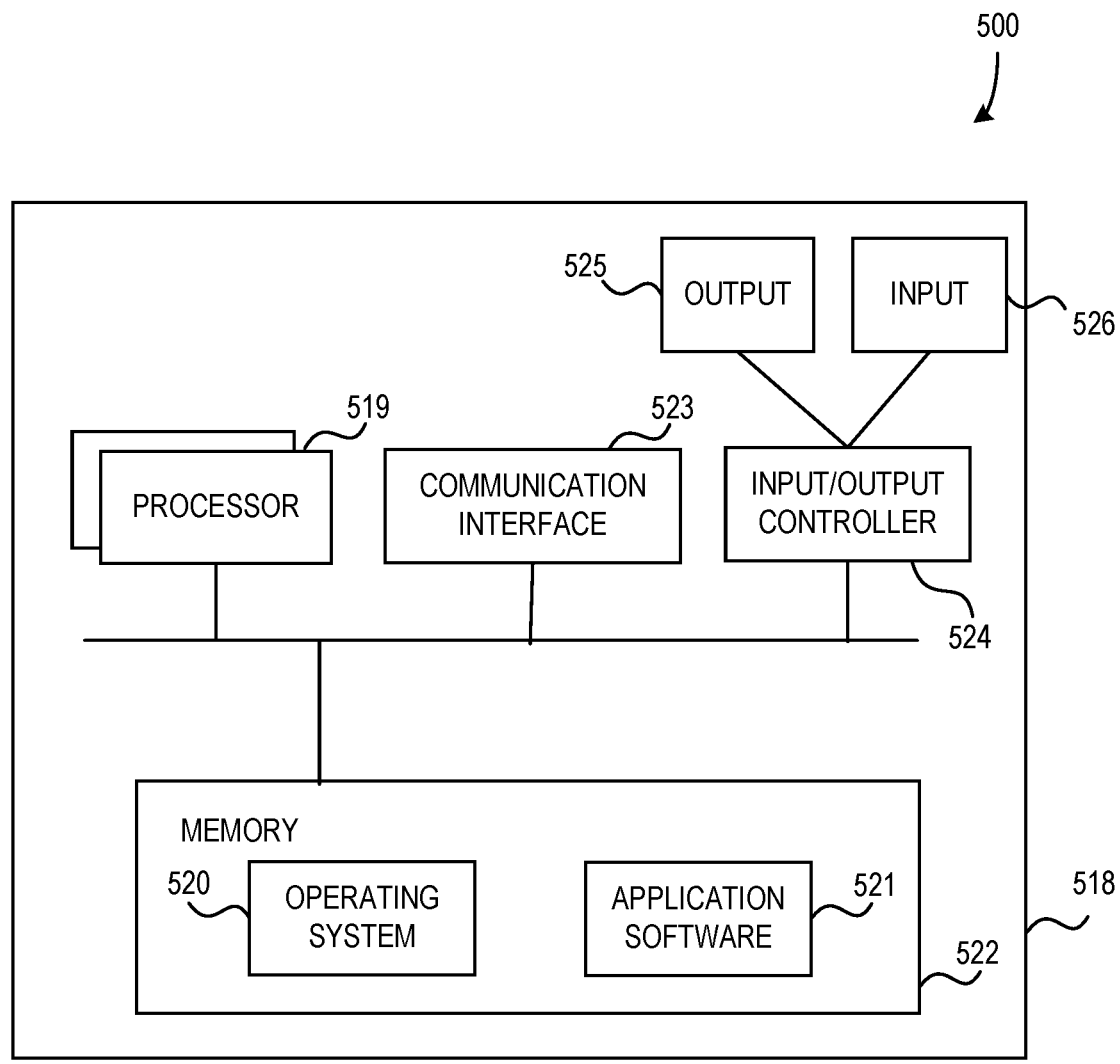
FIG. 5 illustrates an example computing apparatus as a functional block diagram.

The present disclosure is operable with a computing apparatus according to an embodiment as a functional block diagram 500 in FIG. 5. In an example, components of a computing apparatus 518 are implemented as a part of an electronic device according to one or more embodiments described in this specification. The computing apparatus 518 comprises one or more processors 519 which may be microprocessors, controllers, or any other suitable type of processors for processing computer executable instructions to control the operation of the electronic device. Alternatively, or in addition, the processor 519 is any technology capable of executing logic or instructions, such as a hard-coded machine. In some examples, platform software comprising an operating system 520 or any other suitable platform software is provided on the apparatus 518 to enable application software 521 to be executed on the device. In some examples, managing the restriction and release of EIDs as described herein is accomplished by software, hardware, and/or firmware.

In some examples, computer executable instructions are provided using any computer-readable media that is accessible by the computing apparatus 518. Computer-readable media include, for example, computer storage media such as a memory 522 and communications media. Computer storage media, such as a memory 522, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that, in some examples, the storage is distributed or located remotely and accessed via a network or other communication link (e.g., using a communication interface 523).

Further, in some examples, the computing apparatus 518 comprises an input/output controller 524 configured to output information to one or more output devices 525, for example a display or a speaker, which are separate from or integral to the electronic device. Additionally, or alternatively, the input/output controller 524 is configured to receive and process an input from one or more input devices 526, for example, a keyboard, a microphone, or a touchpad. In one example, the output device 525 also acts as the input device. An example of such a device is a touch sensitive display. The input/output controller 524 may also output data to devices other than the output device, e.g., a locally connected printing device. In some examples, a user provides input to the input device(s) 526 and/or receives output from the output device(s) 525.

The functionality described herein may be performed, at least in part, by one or more hardware logic components.

According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises a processor; and a memory comprising computer program code, the memory and the computer program code configured to cause the processor to: obtain an entity identifier (EID) of a deactivated data record entity, wherein the EID uniquely identifies the deactivated data record entity among a group of data record entities; restrict the obtained EID from being assigned to another data record entity; obtain interaction data associated with the deactivated data record entity and the EID, the interaction data associated with interactions between the deactivated data record entity and other entities prior to deactivation of the deactivated data record entity; determine a release time of the EID using the obtained interaction data; release the restricted EID for assignment based on the determined release time; and assign the released EID to a new data record entity.

An example computerized method comprises obtaining an entity identifier (EID) of a deactivated data record entity, wherein the EID uniquely identifies the deactivated data record entity among a group of data record entities; restricting the obtained EID from being assigned to another data record entity; obtaining interaction data associated with the deactivated data record entity and the EID, the interaction data associated with interactions between the deactivated data record entity and other entities prior to deactivation of the deactivated data record entity; determining a release time of the EID using the obtained interaction data; releasing the restricted EID for assignment based on the determined release time; and assigning the released EID to a new data record entity.

One or more computer storage media have computer-executable instructions that, upon execution by a processor, cause the processor to at least: obtain an entity identifier (EID) of a deactivated data record entity, wherein the EID uniquely identifies the deactivated data record entity among a group of data record entities; restrict the obtained EID from being assigned to another data record entity; obtain interaction data associated with the deactivated data record entity and the EID, the interaction data associated with interactions between the deactivated data record entity and other entities prior to deactivation of the deactivated data record entity; determine a release time of the EID using the obtained interaction data; release the restricted EID for assignment based on the determined release time; and assign the released EID to a new data record entity.

Alternatively, or in addition to the other examples described herein, examples include any combination of the following:

wherein determining the release time of the EID using the obtained interaction data includes: calculating a first interaction feature data value using the obtained interaction data, wherein the first interaction feature data value is indicative of a first feature of the obtained interaction data; calculating a second interaction feature data value using the obtained interaction data, wherein the second interaction feature data value is indicative of a second feature of the obtained interaction data; mapping the first interaction feature data value to a first interval modifier score using a first interval modifier map associated with the first feature; mapping the second interaction feature data value to a second interval modifier score using a second interval modifier map associated with the second feature; combining the first interval modifier score and the second interval modifier score into a combined interval modifier score; applying the combined interval modifier score to a maximum restricted time interval to form a modified restricted time interval; and determining the release time of the EID using the modified restricted time interval.

wherein the first interaction feature data value is a total interaction quantity value and the second interaction feature data value is value indicating a total quantity of other entities with which the deactivated data record entity interacted in the interactions of the interaction data.

wherein determining the release time of the EID using the obtained interaction data includes: providing a maximum restricted time interval and the obtained interaction data to a restricted time interval model as input, wherein the restricted time interval model has been trained using machine learning techniques; and generating the release time of the EID as output of the restricted time interval model.

further comprising: collecting model feedback data associated with the released EID and the new data record entity to which the released EID is assigned; and adjusting the restricted time interval model based on the collected model feedback data using machine learning techniques.

wherein the interaction data includes data associated with interactions that took place during a defined time interval prior to the deactivated data record entity being deactivated.

further comprising: obtaining updated interaction data associated with the deactivated data record entity and the EID prior to releasing the EID; determining an updated release time of the EID using the obtained updated interaction data; and wherein releasing the restricted EID for assignment based on the determined release time includes releasing the restricted EID for assignment based on the updated release time.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for obtaining an entity identifier (EID) of a deactivated data record entity, wherein the EID uniquely identifies the deactivated data record entity among a group of data record entities; exemplary means for restricting the obtained EID from being assigned to another data record entity; exemplary means for obtaining interaction data associated with the deactivated data record entity and the EID, the interaction data associated with interactions between the deactivated data record entity and other entities prior to deactivation of the deactivated data record entity; exemplary means for determining a release time of the EID using the obtained interaction data; exemplary means for releasing the restricted EID for assignment based on the determined release time; and exemplary means for assigning the released EID to a new data record entity.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor;
   an available entity identifier pool;
   a restricted entity identifier pool; and
   a memory comprising computer program code, the memory and the computer program code configured to cause the processor to:
   obtain an entity identifier (EID) of a deactivated data record entity, wherein the EID uniquely identifies the deactivated data record entity among a group of data record entities;
   restrict the obtained EID from being assigned to a new data record entity, the restriction comprising adding the EID to the restricted entity identifier pool to prevent reassignment of the obtained EID to a new data record entity;

obtain interaction data associated with the deactivated data record entity and the EID, the interaction data associated with interactions between the deactivated data record entity and other entities prior to deactivation of the deactivated data record entity;

dynamically determine a release time of the EID using the obtained interaction data, the determined release time configured to reduce usage of data storage resources associated with the restricted entity identifier pool by reducing an average amount of time between restricting the obtained EID and the determined release time;

release the restricted EID from the restricted entity identifier pool to the available entity identifier pool for reassignment based on the determined release time; and assign the released EID to the new data record entity.

2. The system of claim 1, wherein determining the release time of the EID using the obtained interaction data includes:

calculating a first interaction feature data value using the obtained interaction data, wherein the first interaction feature data value is indicative of a first feature of the obtained interaction data;

calculating a second interaction feature data value using the obtained interaction data, wherein the second interaction feature data value is indicative of a second feature of the obtained interaction data;

mapping the first interaction feature data value to a first interval modifier score using a first interval modifier map associated with the first feature;

mapping the second interaction feature data value to a second interval modifier score using a second interval modifier map associated with the second feature;

combining the first interval modifier score and the second interval modifier score into a combined interval modifier score;

applying the combined interval modifier score to a maximum restricted time interval to form a modified restricted time interval; and determining the release time of the EID using the modified restricted time interval.

3. The system of claim 2, wherein the first interaction feature data value is a total interaction quantity value and the second interaction feature data value is value indicating a total quantity of other entities with which the deactivated data record entity interacted in the interactions of the interaction data.

4. The system of claim 1, wherein determining the release time of the EID using the obtained interaction data includes:

providing a maximum restricted time interval and the obtained interaction data to a restricted time interval model as input, wherein the restricted time interval model has been trained using machine learning techniques; and generating the release time of the EID as output of the restricted time interval model.

5. The system of claim 4, wherein the memory and the computer program code are configured to further cause the processor to:

collect model feedback data associated with the released EID and the new data record entity to which the released EID is assigned; and adjust the restricted time interval model based on the collected model feedback data using machine learning techniques.

6. The system of claim 1, wherein the interaction data includes data associated with interactions that took place during a defined time interval prior to the deactivated data record entity being deactivated.

7. The system of claim 1, wherein the memory and the computer program code are configured to further cause the processor to:

obtain updated interaction data associated with the deactivated data record entity and the EID prior to the release of the EID;

determine an updated release time of the EID using the obtained updated interaction data; and wherein releasing the restricted EID for assignment based on the determined release time includes releasing the restricted EID for assignment based on the updated release time.

8. A computerized method comprising:

obtaining an entity identifier (EID) of a deactivated data record entity, wherein the EID uniquely identifies the deactivated data record entity among a group of data record entities;

restricting the obtained EID from being assigned to a new data record entity, the restriction comprising adding the EID to a restricted entity identifier pool to prevent reassignment of the obtained EID to a new data record entity;

obtaining interaction data associated with the deactivated data record entity and the EID, the interaction data associated with interactions between the deactivated data record entity and other entities prior to deactivation of the deactivated data record entity;

dynamically determining a release time of the EID using the obtained interaction data, the determined release time configured to reduce usage of data storage resources associated with the restricted entity identifier pool by reducing an average amount of time between restricting the obtained EID and the determined release time;

release the restricted EID from the restricted entity identifier pool to an available entity identifier pool for reassignment based on the determined release time; and assigning the released EID to the new data record entity.

9. The computerized method of claim 8, wherein determining the release time of the EID using the obtained interaction data includes:

calculating a first interaction feature data value using the obtained interaction data, wherein the first interaction feature data value is indicative of a first feature of the obtained interaction data;

calculating a second interaction feature data value using the obtained interaction data, wherein the second interaction feature data value is indicative of a second feature of the obtained interaction data;

mapping the first interaction feature data value to a first interval modifier score using a first interval modifier map associated with the first feature;

mapping the second interaction feature data value to a second interval modifier score using a second interval modifier map associated with the second feature;

combining the first interval modifier score and the second interval modifier score into a combined interval modifier score;

applying the combined interval modifier score to a maximum restricted time interval to form a modified restricted time interval; and determining the release time of the EID using the modified restricted time interval.

10. The computerized method of claim 9, wherein the first interaction feature data value is a total interaction quantity value and the second interaction feature data value is value indicating a total quantity of other entities with which the deactivated data record entity interacted in the interactions of the interaction data.

11. The computerized method of claim 8, wherein determining the release time of the EID using the obtained interaction data includes:

providing a maximum restricted time interval and the obtained interaction data to a restricted time interval model as input, wherein the restricted time interval model has been trained using machine learning techniques; and generating the release time of the EID as output of the restricted time interval model.

12. The computerized method of claim 11, further comprising:

collecting model feedback data associated with the released EID and the new data record entity to which the released EID is assigned; and adjusting the restricted time interval model based on the collected model feedback data using machine learning techniques.

13. The computerized method of claim 8, wherein the interaction data includes data associated with interactions that took place during a defined time interval prior to the deactivated data record entity being deactivated.

14. The computerized method of claim 8, further comprising:

obtaining updated interaction data associated with the deactivated data record entity and the EID prior to releasing the EID;

determining an updated release time of the EID using the obtained updated interaction data; and wherein releasing the restricted EID for assignment based on the determined release time includes releasing the restricted EID for assignment based on the updated release time.

15. A computer storage medium has computer-executable instructions that, upon execution by a processor, cause the processor to at least:

obtain an entity identifier (EID) of a deactivated data record entity, wherein the EID uniquely identifies the deactivated data record entity among a group of data record entities;

restrict the obtained EID from being assigned to a new data record entity, the restriction comprising adding the EID to a restricted entity identifier pool to prevent reassignment of the obtained EID to a new data record entity;

obtain interaction data associated with the deactivated data record entity and the EID, the interaction data associated with interactions between the deactivated data record entity and other entities prior to deactivation of the deactivated data record entity;

dynamically determine a release time of the EID using the obtained interaction data, the determined release time configured to reduce usage of data storage resources associated with the restricted entity identifier pool by reducing an average amount of time between restricting the obtained EID and the determined release time;

release the restricted EID from the restricted entity identifier pool to an available entity identifier pool for reassignment based on the determined release time; and assign the released EID to the new data record entity.

16. The computer storage medium of claim 15, wherein determining the release time of the EID using the obtained interaction data includes:

calculating a first interaction feature data value using the obtained interaction data, wherein the first interaction feature data value is indicative of a first feature of the obtained interaction data;

calculating a second interaction feature data value using the obtained interaction data, wherein the second interaction feature data value is indicative of a second feature of the obtained interaction data;

mapping the first interaction feature data value to a first interval modifier score using a first interval modifier map associated with the first feature;

mapping the second interaction feature data value to a second interval modifier score using a second interval modifier map associated with the second feature;

combining the first interval modifier score and the second interval modifier score into a combined interval modifier score;

applying the combined interval modifier score to a maximum restricted time interval to form a modified restricted time interval; and determining the release time of the EID using the modified restricted time interval.

17. The computer storage medium of claim 16, wherein the first interaction feature data value is a total interaction quantity value and the second interaction feature data value is value indicating a total quantity of other entities with which the deactivated data record entity interacted in the interactions of the interaction data.

18. The computer storage medium of claim 15, wherein determining the release time of the EID using the obtained interaction data includes:

providing a maximum restricted time interval and the obtained interaction data to a restricted time interval model as input, wherein the restricted time interval model has been trained using machine learning techniques; and generating the release time of the EID as output of the restricted time interval model.

19. The computer storage medium of claim 18, wherein the computer-executable instructions, upon execution by the processor, further cause the processor to at least:

collect model feedback data associated with the released EID and the new data record entity to which the released EID is assigned; and adjust the restricted time interval model based on the collected model feedback data using machine learning techniques.

20. The computer storage medium of claim 15, wherein the interaction data includes data associated with interactions that took place during a defined time interval prior to the deactivated data record entity being deactivated.

* * * * *